Patented Mar. 25, 1924.

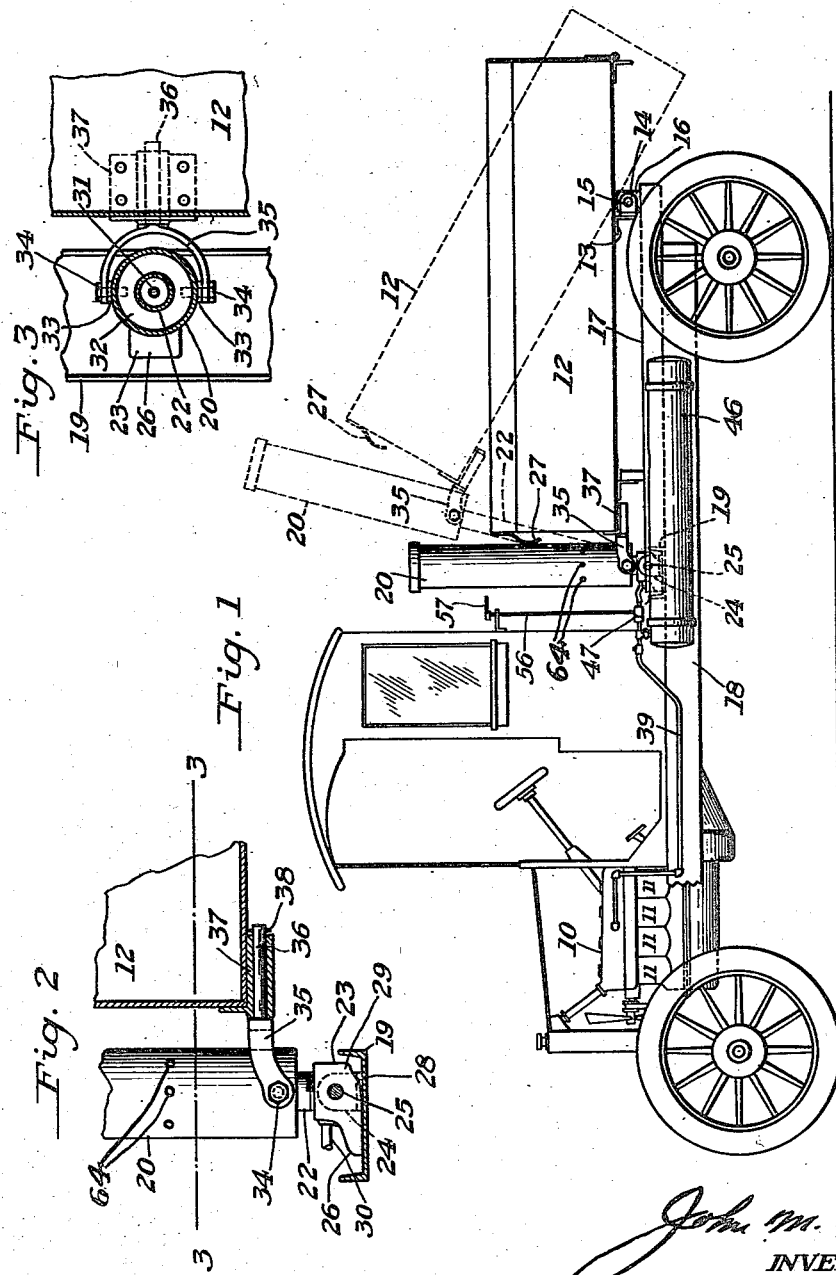

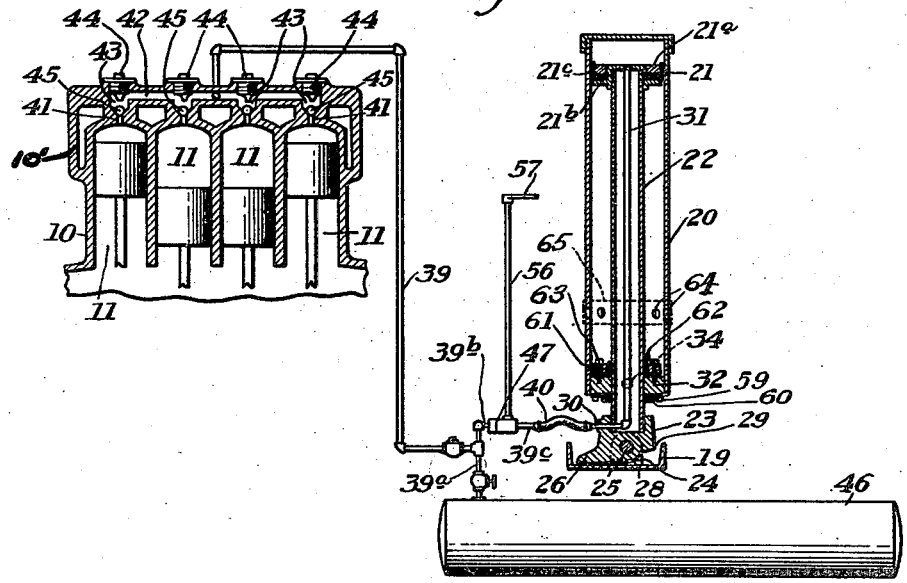
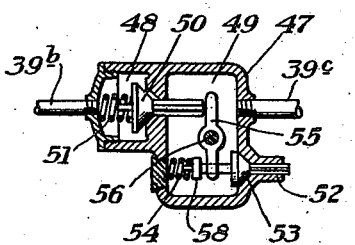
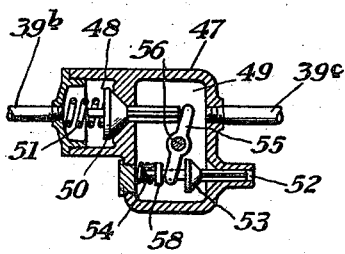
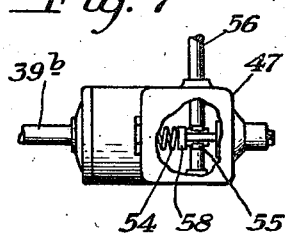
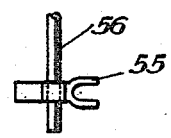

1,488,267

UNITED STATES PATENT OFFICE.

JOHN M. MEYERS, OF PITTSBURGH, PENNSYLVANIA.

PRESSURE DUMPING HOIST.

Application filed March 30, 1922. Serial No. 548,211.

*To all whom it may concern:*

Be it known that I, JOHN M. MEYERS, a citizen of the United States, residing at Pittsburgh, in the county of Allegheny and State of Pennsylvania, have invented certain new and useful Improvements in Pressure Dumping Hoists, of which the following is a specification.

My invention relates to power operated means associated with the dump body of a truck, by which the dump body is quickly manipulated to bring it into inclined position to discharge its load and return it to its normal position on the truck.

One object of the invention is to provide a hoisting and lowering means for operating the dump body of a truck, that will be operated by a source of power carried by the truck, which operating means shall embody simplicity of construction, be compact in form, relatively light in weight, and capable of performing its operations quickly and under easy and safe control throughout its operations.

An important object of the invention is to provide the hoisting and lowering means associated with the dump body of a motor driven truck, that will derive its operating power from the motor, preferably during a small part of the time when the motor is propelling the truck and the load is on its way to destination, and without interfering with the normal propelling of the truck, so that even in very short hauls a source of stored pressure will be created for immediate use and sufficient to make the dumping operation almost instantaneous.

A further object of the invention is to make provision whereby the pressure for operating the hoist shall be derived from the motor operating pressure in a manner that will be imperceptible in its demand on the motor by reason of making the pressure demand very slight and distributing the pressure drain among the several pressure charges generated in the motor, and thereby avoid the unbalancing of the motor, and eliminating vibration or other objectionable defects on the normal running of the motor, while at the same time the stored pressure in quickly reaching the full pressure present in the motor will balance therewith and automatically cut off the operation of storing pressure and leave the motor free from further contributing pressure until the next occasion for a storage charge requires its production.

The invention, therefore, broadly consists in associating with a dump body of a truck, an operating pressure chamber member and a plunger element working within the chamber, the said members forming an extensible actuating connection between the truck and the dump body, and preferably combining therewith a storage pressure chamber in controlled communication with the pressure space of the operating pressure chamber.

The invention further consists in mounting the extensible actuating connection above referred to between the truck and the dump body to oscillate as a whole upon the truck to accommodate itself to the circular movement described by the end of the dump body in the dumping operation.

The invention further consists in providing a motor-driven truck having a dump body, with means for actuating the dump body, comprising an operating pressure chamber and a plunger element working within said chamber to form in their combination an extensible connection between the truck and the dump body, a storage pressure chamber in controlled communication with the pressure space of the operating pressure chamber member, and means forming the communication between the motor and the said pressure chamber, whereby a small portion of the pressure from each explosion within the motor will be directed to either one or the other of the said pressure chambers of the actuating means for a sufficient time to furnish the needed pressure to operate the dump body, and without interfering with the operation of the engine in propelling the truck.

The invention also consists in certain other novel features in the construction and arrangement of parts, all as hereinafter described and as fully set forth in the appended claims.

In the accompanying drawings:—

Figure 1 is a side view of a motor truck with dump body, and showing the application of the invention thereto.

Figure 2 is an enlarged fragmentary view showing the pivotal connection between the dump body and the actuating pressure chamber.

Figure 3 is an enlarged fragmentary view showing a horizontal section taken on the line 3—3 of Figure 2.

Figure 4 is a view in elevation, showing in their assembled relations with the motor of a truck, the dump body actuating device and the pressure storage chamber, the motor and actuating device being shown in vertical section.

Figure 5 is an enlarged detail view showing a horizontal section taken through the valve casing of the control means, in which casing are disclosed a valve for admitting the pressure to the body actuating device, and its exhaust therefrom, the parts being shown admitting pressure.

Figure 6 is a view similar to Figure 5, but showing the valves operating to close the admission of pressure and open the exhaust port of the valve casing.

Figure 7 is a view in side elevation of the valve casing of Figures 5 and 6, shown broken away to disclose the valve operating cross head.

Figure 8 is a view in elevation of the valve operating cross head.

As the present invention is designed especially for application to a motor-propelled truck, the motor being of the explosion type, the motor 10 shown installed upon the truck is of that type and embodies a plurality of explosive cylinders 11, and the dump body 12 is of any approved construction being mounted to tilt by raising the forward end, preferably provided as shown, with a transverse angle bar 13 secured to the under side thereof upon which bar is secured perforated lugs 14 formed of angle plates and through which lugs extends the pivot bar 15 supported in upstanding lugs or plates 16, securely fastened to the frame 17 of the truck.

The casing of the motor 10 is provided with a water jacket 10'.

At a point slightly in front of the forward end of the dump body, is secured to the side frames 18 of the truck chassis a cross bar 19, preferably of channel iron, which, while bracing the truck framing, furnishes a base for supporting, and securing to the truck, the means for actuating the dump body. This actuating means consists of a cylinder 20 closed at its upper end and working on a plunger member comprising preferably a piston 21 and a tubular guide rod 22, which connects with the cross channel bar 19 centrally of the truck and through a foot casting 23 in which the rod is threaded, that is pivoted between lugs 24 to provide a fore and aft rocking movement to the casting 23 and permit the plunger member and its cylinder to oscillate as a whole on the pivot 25, in order to accommodate the same to the swinging of the dump body. The foot casting 23 has a forwardly extending toe or projection 26 to engage the cross bar 19 and form a stop to limit the oscillation forward to a vertical position, in which position it will be rigid against the forward movement of the dump body when lowering and give a steadying and guiding resistance to the descending dump body, which is provided with a spring 27 to bring about a yielding engagement with the moving member or cylinder 20 as it descends from the release of pressure therein. To permit the foot casting to rock toward the dump body from the vertical position, it is rounded on its under-face and rear lower corner as at 28, and a rearwardly projecting raised portion 29 forms a stop to the backward rocking movement by engaging with the cross bar 19.

The foot casting 23 is drilled with a vertical bore partly through the same, which bore is threaded to receive the tubular rod 22, and this bore is connected with a transverse bore into which extends a small pipe 30 that enters the tubular rod 22 and forms a continuation of the pipe or duct 31, extending within the rod the full length thereof and having its upper end secured within the piston 21 and in open relation to the pressure space of the cylinder 20, the piston forming a closure to the tubular rod 22 by being formed with a threaded socket 21$^a$ to receive the threaded end of the rod. The piston 21 is also provided with a threaded annular member 21$^b$ which is screwed upon the piston and between the members 21$^a$ and 21$^b$ a suitable flexible washer 21$^c$ is clamped, that is upwardly flanged to make a movable seal or packing to the pressure agent admitted through the pipe 31.

At its lower end the cylinder 20 is fitted with a substantial ring 32 to form a guide and lateral support on the tubular rod of the plunger, the opening therein being sufficient to receive the rod and permit its sliding therein. On opposite sides of the cylinder are bearing bosses 33, which carry the branches of a yoke 35 and form trunnions therefor. Set bolts 34 pass through the branches of yoke 35 and screw into ring 32, thus connecting the yoke for pivotal movement transversely of the cylinder on its longitudinal axis, and forming a means of connection to the dump body by a stub shaft 36, which forms a suspension pivot to the dump body 12 along its longitudinal axis, the dump body being provided with a bearing plate 37 to receive the stub shaft and which is held within the plate by a cotter pin 38, or in any other suitable manner. By this connecting means, the lifted load is capable of adjustment upon the stub shaft, and any undue side tilting strain will be distributed to the opposite sides of the cylinder 20 through the yoke 35, which by its transverse pivotal movement makes the connection between the body 12 and the cylinder 20 universal in character to dissipate unnecessary strains from the load and torsions of the truck framing.

Pressure is supplied to the cylinder 20 through the pipe line 39, which connects at one end with the pipe nipple 30, through a flexible tubing 40 that assumes the bent form shown when the parts are in normal position, but which straightens out in the swinging movement rearward of the rocking foot casting. At its other end the pipe line 39 communicates with each of the explosion chambers of the motor 10 through a small port 41 formed in each cylinder and connected with the pipe 39 through a suitable coring or duct 42 formed in the cylinder block, or by a pipe having the same manifold connections, which will be likewise cooled by the circulation of water, otherwise the pressure gases would be too hot to use and burn the piping. In the drawing, the chambers 43 are closed by the threaded plugs 44, which extend within to form stops to limit the movement of the balls 45, which serve as check valves to the ports 41 to allow the escape through the ports at each explosion of a portion of the explosive pressure to the chamber 43 with which pipe 39 is connected and thence to the cylinder 20, or tank 46.

Horizontally arranged along the side of the truck or between its side frames, is a storage pressure tank 46 with which the pipe 39 communicates through the branch pipe 39$^a$, so that a supply of pressure may be accumulated quickly during the propulsion of the truck while traveling with its load even the short length of a city block by reason of the large aggregate of explosions made in all the cylinders that contribute to the supply and make it possible even in such short hauls to store the full amount of pressure needed to operate almost instantly the body actuating means. The pipe 39$^a$ is provided with a valve for cutting off the communication to the tank 46 when desired, as when it is necessary to admit the pressure direct from the motor to the pressure cylinder 20, in which case the pressure is conducted into the pressure controlling valve 47 through the pipe continuation 39$^b$ and through the pipe section 39$^c$, which forms a portion of the conduit common also to the storage supply of pressure.

The pressure control valve 47, as shown in Figures 5, 6 and 7, consists of a casing partitioned into two chambers 48 and 49, the pipe 39$^b$ from the tank or the motor direct, admitting the pressure to chamber 48 against a valve 50 for closing the opening from chamber 48 to chamber 49 that is in open relation to the pressure cylinder 20 through the pipe section 39$^c$ and its further connecting sections, which valve is under the tension of a spring 51 to give an initial seating pressure at all times. The chamber 49 is provided with an exhaust port 52 controlled by a valve 53 within the chamber that seats under the action of a spring 54 and is pressure seated when the valve 50 is open, the stems of both valves extending parallel to each other within the chamber 49 and operated by a cross head 55 that is pivoted between the two valves, being secured to a vertical operating stem 56 extending within convenient reach of the operator of the truck and fitted with a lever handle 57 by which the stem is rocked. In one direction of rocking movement, one arm of the cross head 55 engages the stem of the valve 50 and unseats it to admit pressure, while in the other direction of movement it allows the valve stem to seat. During this latter movement of the cross head the other arm thereof slides on the stem of the valve 53, and while inactive upon the valve stem, during the opening movement of the valve 50 and upon the full closing movement of said valve engages at the end of said closing movement a head 58 of the stem of valve 53 to cause the turning of the control stem 56 to permit the opening of the exhaust valve 53.

During the rise of the pressure cylinder 20 to dump the load there are situations which may cause the load to concentrate at the rear, as by the failure of the end gate to open from any cause, thus preventing the discharge of the load except over the top of the end of the body, and under such sudden unbalancing there will be a tendency due to the shifted load to cause the front end of the body to rise suddenly to its upward limit of movement and bring the ring 32 at base of cylinder against the under side of the piston 21 with such impact as to break or injure the parts and with the consequent possible danger of overturning the body backwards. To prevent this, the cylinder acts as a dash-pot in having the ring 32 provided on its under side with a packing washer 59 held in place by a shallow cup plate 60, and on its upper side with a flexible pressure washer 61 held in place by a clamping ring 62 and bolts 63. The lower washer serves as a cleaner to the rod 22, while the pressure washer 61 acts to retard the movement of the cylinder both in ascending and descending, inlets and outlets for the air being furnished by the holes 64, which are covered by a screen 65 surrounding the cylinder at this point. The holes 64 besides permitting a measured intake and escape of the air below the piston 21 serve to provide an automatic check to the rise of the cylinder 20 by providing an escape for the pressure above the piston should the cylinder rise sufficiently to bring these openings above the piston, which would happen if the operator failed to cut off the admitted pressure of the valve controlled lever 57. By reason of the location of these openings 64 above the ring 32, a pocket of air is presented to the underside of the piston 21 so that the cylinder is cushioned at the upward limit of movement, thus preventing the ring 32 and its gasket from striking the piston as well as providing a final cushioning effect to the dumping action should there be a sudden dumping movement from the shifting of the load or otherwise.

From the foregoing it will be seen that a simple and compact means is provided for effectively operating the dump body, that stores its operating pressure while the load is being hauled, and in a short distance and without interference with the normal propelling use of the motor, by using from the series of cylinders a small portion of the explosive pressure from each cylinder, thereby raising a sufficient supply of pressure that is quickly available to operate the dump body with the maximum of dispatch.

I am aware that the explosive pressure of motors has been utilized in connection with a storage tank for the accumulation of pressure, but the accumulated pressure has heretofore been taken, so far as I have been able to learn, from one cylinder and not from all the cylinders as herein provided to make imperceptible the demand on any one cylinder and with a view to keeping the engine in its normal balanced working, free from vibration and thoroughly effective in its normal operation of propelling the truck. By the arrangement employed herein, provision is made against the possibility of one or more of the cylinders being defective, in which case if the pressure were taken from only one cylinder that cylinder in being defective would cause the hoisting apparatus to cease functioning. Furthermore, by reason of taking the gases in small quantities from a multiplicity of cylinders and causing them to be reduced in temperature by the water-circulatory system, the aggregate result of pressure gases is such that they may be safely used in the piping and other parts of the apparatus without burning.

What is claimed is:—

1. In a truck having a dump body mounted thereon, the combination therewith of means for actuating the dump body, comprising a member connected with the truck to oscillate thereon and carrying a plunger, and a pressure chamber adapted to receive said plunger member and have reciprocating movement thereon, and means connecting said pressure chamber to the dump body.

2. In a truck having a dump body mounted thereon, the combination therewith of means for actuating the dump body, comprising a member having a pressure chamber and a plunger member pivotally connected to the truck and upon which the pressure chamber member is adapted to reciprocate and have oscillation therewith, and means pivotally connecting the pressure chamber member with the dump body.

3. In a truck having a dump body mounted thereon, the combination therewith of means for actuating the dump body, comprising a member having a pressure chamber connected to move with the forward end of the dump body, and a plunger member working therein and connecting with the truck, and means carried by the plunger member for supplying pressure to the pressure chamber through the plunger of the plunger member.

4. In a truck having a dump body mounted thereon, the combination therewith of means for actuating the dump body, comprising an upstanding member connected with the truck to oscillate thereon and carrying a plunger, and a pressure chamber adapted to receive said plunger member and have reciprocating movement thereon, and means connecting said pressure chamber to the dump body to move therewith.

5. In a truck having a dump body mounted thereon, the combination therewith of means for actuating the dump body, comprising a member having a pressure chamber and a plunger member working therein and upon which the pressure chamber member has reciprocating movement, the said plunger member being connected to the truck to oscillate thereon with its pressure chamber member, and means connecting the pressure chamber member directly with the dump body to transmit movement thereto.

6. In a truck having a dump body mounted thereon, the combination therewith of means for actuating the dump body, comprising a member having a pressure chamber and a plunger member working therein and forming a guide for the reciprocation of the pressure chamber thereon, said pressure chamber member being connected at its lower end with the forward part of the dump body and means for supplying pressure to the pressure chamber.

7. In a truck having a dump body mounted thereon, the combination therewith of means for actuating the dump body, comprising a member having a pressure chamber and a tubular plunger member working in the pressure chamber and pivotally connected at one end with the truck, the said pressure chamber member oscillating therewith and having reciprocating movement thereon and flexibly connected with the dump body, and means for introducing a pressure agent into the pressure chamber through the tubular plunger member.

8. In a truck having a dump body mounted thereon, the combination therewith of means for actuating the dump body, comprising a member having a pressure chamber and a plunger member working therein, the combined members being disposed centrally upon the truck to oscillate thereon, a suspension means for the dump body connecting it at its forward end to the outwardly moving member to permit pivotal movement of the dump body along the longitudinal axis thereof at said point of suspension, and means for supplying pressure to the pressure chamber.

9. In a truck having a dump body mounted thereon, the combination therewith of means for actuating the dump body, comprising a member having a pressure chamber and a plunger member working therein, the combined members being disposed centrally upon the truck to oscillate thereon, means connecting the dump body at its front end with the outwardly moving member to furnish a pivotal support to the dump body at that end along its longitudinal axis, said means being pivotally connected to the said moving member transversely of said longitudinal axis, and means for supplying pressure to the pressure chamber.

10. In a truck having a dump body mounted thereon, the combination therewith of means for actuating the dump body, comprising a member having a pressure chamber and a plunger member working therein, the said combined members being disposed centrally of the truck and mounted to oscillate thereon as a whole and having the outwardly moving member connected for universal movement at its base with the front end of the dump body on the longitudinal axis of the dump body, and means for supplying pressure to the pressure chamber.

11. In a truck having a dump body mounted thereon, the combination therewith of means for actuating the dump body, comprising a member having a pressure chamber and a plunger member working therein, the said combined members being disposed centrally of the truck and mounted to oscillate thereon as a whole, the pressure chamber member being the outwardly moving member, a yoke pivotally connecting the said chamber member between its branches and having a pivotal supporting connection with the dump body along the longitudinal axis thereof, and means for supplying pressure to the pressure chamber.

12. In a truck having a dump body mounted thereon, the combination therewith of means for actuating the dump body, comprising a member having a pressure chamber and a plunger member working therein, the said plunger member being disposed centrally of the truck and mounted to oscillate thereon, a yoke having trunnions to pivot the pressure chamber member transversely along its longitudinal axis and having a pivotal supporting connection with the dump body along the longitudinal axis thereof, and means for supplying pressure to the pressure chamber.

13. In a truck having an explosion engine of multiple explosion chambers for propelling the same, and a dump body, of pressure actuated means for actuating the dump body, and a conduit for conducting pressure thereto from the engine, in communication with each explosion chamber and having check valves to close the communication to each chamber, whereby the successive explosions will contribute a small part of their pressure to operate said pressure actuating means without interfering with the normal propelling efficiency of the engine.

14. In a truck having an explosion engine of multiple explosion chambers for propelling the same, and a dump body, the combination therewith of pressure actuating means for actuating the dump body, comprising a member having a pressure chamber and a plunger member working therein, means connecting said actuating means with the dump body and the truck, and a conduit communicating with the pressure chamber and with each explosion chamber of the engine and adapted to receive the explosive pressure of the engine at each explosion, and having check valves to close the engine communication thereto, whereby the successive explosions will contribute a small part of their pressure to actuate said pressure actuating means.

15. In a truck having an explosion engine of multiple explosion chambers for propelling the same, and a dump body, of pressure actuated means for actuating the dump body, comprising a member having a pressure chamber movable with the dump body, and a plunger member working therein and mounted to oscillate upon the truck, a conduit extending within the plunger member in communication with the pressure chamber of the pressure chamber member and having valve controlled communication at its other end with each of the explosion chambers of the engine, whereby said successive explosions will contribute a small part of their pressure to actuate said pressure actuating means.

16. In a truck having an explosion engine of multiple explosion chambers for propelling the same, and having a dump body, the combination therewith of pressure actuated means for actuating the dump body, a conduit for conducting pressure thereto from the engine, said conduit extending within a water-jacketed compartment in the engine and connecting the explosion chambers of the several cylinders of the engine, whereby the pressure gases escaping from each explosion will be initially reduced in temperature to permit their use.

17. In a truck having a dump body mounted thereon, the combination therewith of means for actuating the dump body, comprising a member having a pressure chamber and a plunger member working therein and extending through one of the closed ends of the pressure chamber element to provide between the said ends and the plunger a cushion air space, said pressure chamber element having air ports located therein above the said closed ends, as and for the purpose set forth.

18. In a truck having an explosion engine of multiple explosion chambers for propelling the same, and a dump body, the combination therewith of pressure actuating means for actuating the dump body, comprising a member having a pressure chamber and a plunger member working therein, means connecting said actuating means with the dump body and the truck, and a conduit equipment communicating with the pressure chamber and with each explosion chamber of the engine and adapted to receive the explosive pressure of the engine at each explosion, and having check valve means to close the engine communication thereto, whereby the successive explosions will contribute a small part of their pressure to actuate said pressure actuating means.

In testimony whereof I affix my signature.

JOHN M. MEYERS.